United States Patent [19]

Shibano et al.

[11] Patent Number: 4,823,138

[45] Date of Patent: Apr. 18, 1989

[54] ROADSIDE BEACON SYSTEM

[75] Inventors: Yoshizo Shibano; Haruo Suzuki; Tohru Iwai, all of Osaka, Japan

[73] Assignee: Sumitomo Electric Industries, Ltd., Osaka, Japan

[21] Appl. No.: 133,393

[22] Filed: Dec. 15, 1987

[30] Foreign Application Priority Data

Dec. 15, 1986 [JP] Japan ................................. 61-298301
Feb. 4, 1987 [JP] Japan ................................. 62-24208

[51] Int. Cl.$^4$ .......................... G01S 3/02; G01S 1/08; G08G 1/12
[52] U.S. Cl. ................................. 342/457; 340/988; 342/386
[58] Field of Search ............... 342/386, 456, 457; 340/988, 990, 991, 992, 993; 364/424.01, 424.02

[56] References Cited

U.S. PATENT DOCUMENTS 3,735,335  5/1973  Kaplan et al. ..................... 342/457
4,209,787  6/1980  Freeny, Jr. ....................... 340/991
4,359,712  11/1982 Matsumura ....................... 340/988

FOREIGN PATENT DOCUMENTS 0193377  11/1984  Japan ............................. 342/457

Primary Examiner—Theodore M. Blum
Assistant Examiner—Gregory C. Issing
Attorney, Agent, or Firm—Sughrue, Mion, Zinn, Macpeak, and Seas

[57] ABSTRACT

A roadside beacon system having improved reliability in the face of multi-path fading and the presence of large vehicles or the like which shield or scatter the received signal. The roadside antenna is of the split beam type. In the navigation system on the vehicle, the received signal is divided into two parts. The first part is smoothed and its level detected to determine when the vehicle is approaching an antenna. The remaining signal is then employed directly to detect the null in the transmitted beam when the vehicle passes directly in front of the antenna.

12 Claims, 8 Drawing Sheets

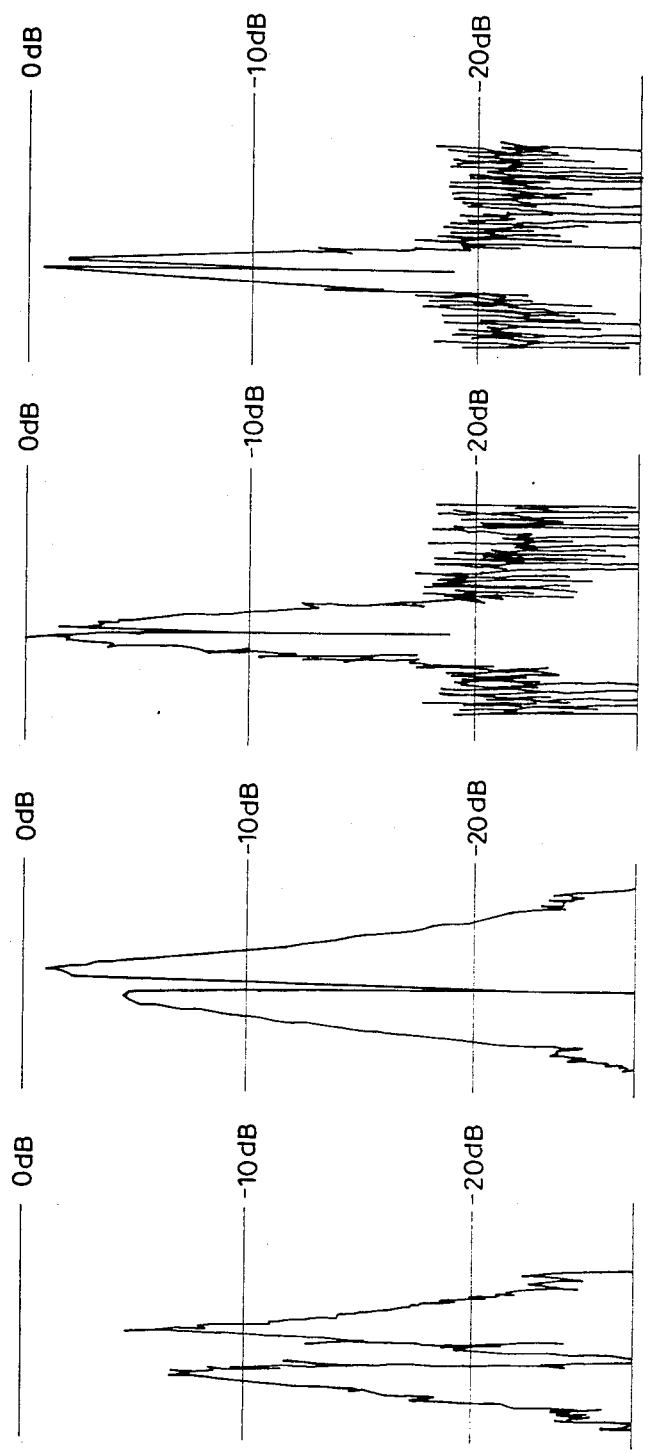

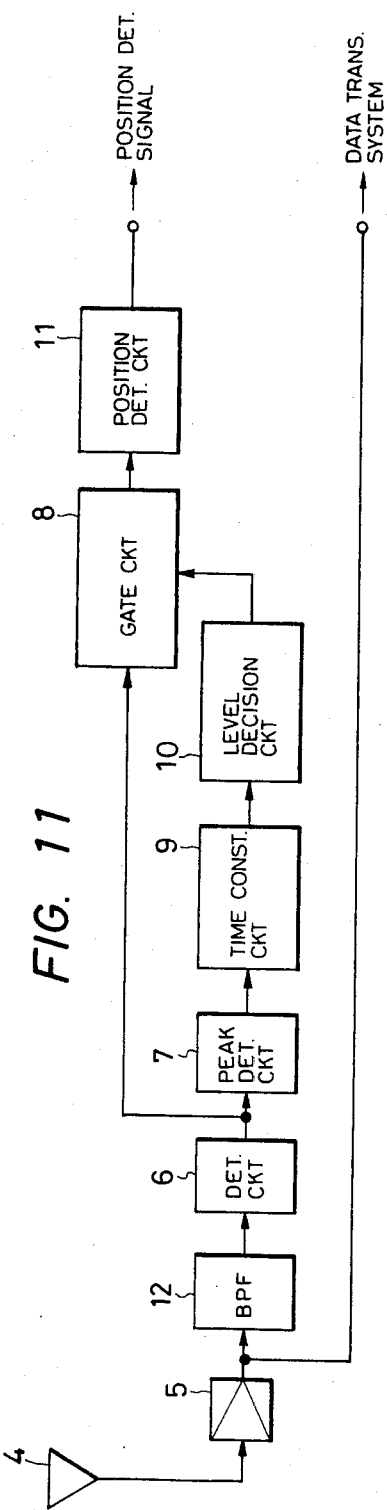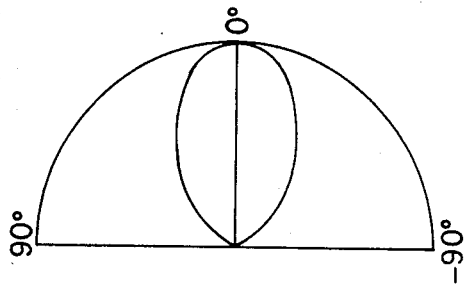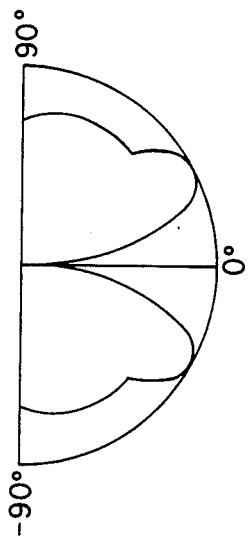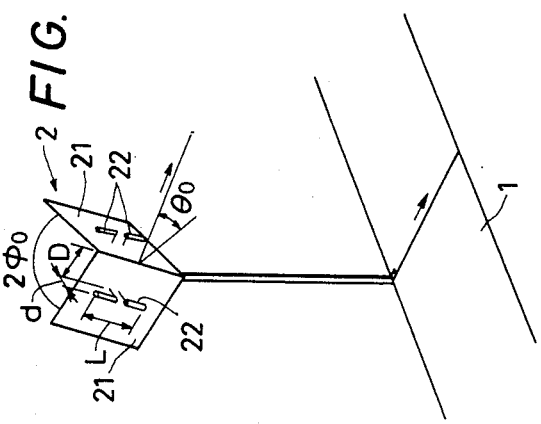
FIG. 11
FIG. 13B
FIG. 13A
FIG. 12

ROADSIDE BEACON SYSTEM

BACKGROUND OF THE INVENTION

The present invention relates to roadside beacon systems, and more particularly to a roadside beacon system used for calibrating a vehicle position in a navigation system in which, after data representing the start point of the vehicle are inputted, the current position of the vehicle is calculated by measured vehicle speed and direction data to display its present position and also used for carrying out data communications between the vehicle and the roadside antenna.

A vehicular navigation system has been proposed in the art in which a small computer and a small display unit are installed in a vehicle; a road map stored in a memory device such as a compact disk is displayed on the display unit; speed data outputted by speed sensors and direction data outputted by direction sensors are utilized to calculate the present position of the vehicle and to determine the present direction of movement of the vehicle at all times, and according to the results of the calculations, a symbol representing the vehicle is indicated on the road map displayed on the display unit.

With such a navigation system, the operator of the vehicle can visually detect the present position and direction of movement of the vehicle with ease and thus can find a destination readily.

However, the above-described navigation system suffers from a potential for inaccuracies which are due to errors accumulated in speed sensors and direction sensors as the vehicle travels a long distance. Therefore, when the distance covered by the vehicle exceeds a certain value (which is not always a constant value and is dependent on the amount of errors accumulated in the speed sensors and the direction sensors and also environmental conditions), the vehicle position displayed on the display unit may be greatly shifted from a true position; that is, the navigation system becomes unreliable and the driver may lose his way.

In order to eliminate the errors in navigation systems, a so-called "roadside beacon system" has been proposed. In this system, roadside antennas are installed along roads at intervals shorter than those with which the errors thus accumulated reach serious values. Each of the antennas radiates signals including position data of antenna location and road direction data to cover a relatively small area. The signals thus transmitted are received by a mobile antenna installed on the vehicle and applied to the navigation equipment whereby, according to the signal thus received, the position and the moving direction of the vehicle are calibrated.

In the roadside beacon system described above, the accumulation of errors is attempted to be maintained at less than aggravating value, whereby an exact present position of the vehicle can always be displayed. Accordingly, the navigation system is reliable. Furthermore, the roadside beacon system has the advantage that, when a roadside antenna is installed, for instance, near a railroad or railroad crossing where the direction sensors are liable to produce a large error, errors attributed to external factors can be corrected effectively.

In the above-described roadside beacon system, however, the roadside antennas are of considerably high directivity, transmitting signals including position data and road direction data at all times, and the vehicle receives the beacon signals only when it passes through a covered area by the signals. If one attempts to cover large areas with each beacon antenna in order to get large communication area it becomes difficult to accurately detect the vehicle's position, because of wide spread field distribution which results in difficulties in exactly distinguishing the antenna position.

This will be described in more detail. The fundamental function of the roadside beacon system is to transmit signals including the position and road direction data to the navigation system in the vehicle. It may also be required for the roadside beacon system to further transmit data to perform the following functions in practical use:

(1) transmission of traffic information as to traffic congestion, construction work on road, detours, etc., in the area around the roadside antenna;

(2) information for a detailed map including the position of buildings or houses with names in the area around the roadside antenna;

(3) information for a road map of a relatively large area including the position of the roadside antenna to renew the road map on the display unit, and (4) two-way communications between the roadside antenna and the vehicle.

Above mentioned applications can be fulfilled only with using an enlarged communication area covered by the roadside antenna in order to realize large volume data transmissions.

However, if the communication area covered by the roadside antenna is enlarged, the detection of the vehicle position which is the primary object of the navigation system, becomes inaccurate.

In addition to the spread field distribution in the enlarged communication area system, there are environmental obstacles to electro-magnetic waves such as vehicles moving nearby, buildings along a road and so on, causing the signal received by vehicle to fluctuate largely. An example of measured field distribution fluctuation caused by the above mentioned factor is shown in FIG. 14a. The fluctuation of signals is the results of receiving waves scattered by or reflected from such obstacles being different in amplitude and phase from one another. In other words, multi-path fading occurs in the signal. Accordingly, calibration of the vehicle position using the signal thus received may involve an unexpected error. That is, the signal received by the mobile antenna may have a high level at a position actually farther away from the roadside antenna, resulting in large positional errors.

The present applicant has filed a Japanese patent application for a roadside beacon system in which, to eliminate this difficulty, "split-beam" antennas having a radiation pattern whereby the electric field strength abruptly decreases directly in front of the antenna are employed for the roadside antennas. When the abrupt decrease of the received signal strength is detected, it is determined that the vehicle is directly confronting the roadside antenna, and the vehicle position data and the moving direction data are calibrated according to the data received just before the detection of the abrupt decrease point. Hence, the effects of multi-path fading on the received signal strength distribution are eliminated.

In this connection, a Japanese patent application has also been filed for a method in which roadside antennas are installed at elevated positions above the road, and the major lobe of the mobile antenna is extended upwardly. Also, a Japanese patent application has been filed for a method in which a roadside antenna is connected to the lower portion of a structure which extends over the road, and the major lobe of the mobile antenna is extended upwardly.

In these roadside beacon systems, a variety of data can be transmitted between the roadside antenna and the vehicle over a wide range with no difficulty, and the accuracy of detection of the vehicle position with respect to the roadside antenna can be considerably improved.

However, these roadside beacon systems may suffer from the following difficulty: In the case where large obstacles like truck and buses which are considerably larger than the vehicle installed with navigation system, are existing around the roadside antenna and the vehicle is in the communication area as shown in FIG. 2, or in the case where the roadside antenna is installed under the bridge structure which is constructed over the road illuminating the road from upside and a large obstructing vehicle or vehicles are moving nearby the vehicle installed with the navigation system as shown in FIG. 3, the large obstructing vehicle will shield or scatter the radio waves resulting in the deterioration of positioning accuracy of the vehicle.

Experimental results will be described in more detail. In the experiment the large obstructing vehicle traveling the central lane shown in FIG. 2 is 8.12 m long, 2.2 m wide and 3.5 m high, the vehicle with navigation system is 1.0 m high, the roadside antenna is 5.0 m in height, and the inclination angle of the main radiation beam of the roadside antenna is 30°. In this case, the fluctuation in the signal level received by the mobile antenna is as shown in FIG. 4A. As is apparent from the comparison with the fluctuation of the signal level (as shown in FIG. 4B) in the case of clear environmental condition in which no substantial electromagnetic obstacles such as large trucks, buses and so on, the signal level variation (FIG. 4A) shows characteristics that an abrupt level decrease attributed to the shielding of the radio waves by the large obstacles and ripple components of up to 10 dB are superposed on the broader and smooth signal level distribution curve determined by the directivities of the roadside antenna and the mobile antenna. Therefore, the accuracy of detection of the vehicle position is somewhat deteriorated.

Another experimental data will now be considered where, in FIG. 3, a large vehicles is traveling along a center lane just below a roadside antenna which is 6 m in height, and the vehicle having the navigation system is moving along an adjacent lane. In this case, the variation in level of the signal received by the mobile antenna is as shown in FIG. 4C. As is apparent from a comparison with the variations the signal level received in the case no large vehicle is moving parallel to the vehicle with the navigation system (as shown in FIG. 4D), the signal level variation of FIG. 4C is such that ripple components of the order of 3 dB attributed to multipath fading are superposed on the broader and smoother signal strength distribution curve determined by the directivities of the roadside antenna and the mobile antenna.

In both of the above-described experiments, the frequency of waves which carry transmitting data is set at about 2.5 GHz.

Thus, in both of the above-described cases, the signal received by the mobile antenna includes ripple components of the order of 3 to 10 dB. However, this causes no problem in data transmission; that is, the data can still be transmitted to the mobile antenna at high speed, because of enough C/N characteristics obtained at the bottom of signal fluctuations.

On the other hand, in the case where a split beam signal from the roadside antenna is used to detect the vehicle position, the following difficulties are involved: Since the split beam signal radiated from the roadside antenna sharply decreases just in front of the roadside antenna and at positions sufficiently far away from the roadside antenna, it is insufficient for detection of the vehicle position merely to detect the decrease in level of the received signal. That is, only sharp fall of the signal level which occurs when the vehicle goes just in front of the roadside antenna.

To satisfy the above requirement, a navigation device has been proposed which has been designed as follows: In the device, the received signal is applied to a low-pass filter so that abrupt variations are removed; i.e., the signal is converted into a signal having a more gently curved characteristic. The signal thus obtained is divided into two signals. From one of the two signals, it is detected that the vehicle is nearing the roadside antenna. When it has been detected that the vehicle has arrived at the region adjacent the roadside antenna, the other signal is applied through a gate circuit to a position detecting section so that the point where abrupt falling of the received signal level occurs can be detected. Thus, the navigator device can detect an abrupt decrease of the received signal level which corresponds to the position just in front of the roadside antenna. However, the device is still not sufficient in that, since the abrupt variations in the level of the received signal are removed by the low-pass filter, when the vehicle is driven at a high speed, the dip in the level of the received signal is not so deep, and therefore the position detecting section may not be able to detect the abrupt decrease in level of the received signal.

The above-described difficulty may be eliminated by removal of the low-pass filter. However, for reasons clear from the above discussion, doing so results in the difficultly that the received signal level decreases not only at the aforementioned abrupt decrease point P (cf. FIG. 4E) where the level should decrease, but also at other points $P_1$, $P_2$ and $P_3$. Therefore, the position detection becomes inferior.

Moreover, the level of the signal received by the mobile antenna varies with the lane on which the vehicle moves; that is, it changes with the distance between the roadside antenna and the mobile antenna. Furthermore, the level depends on the inherent fluctuations in sensitivity of the roadside device and also the mobile device. Therefore, it is very difficult to set the fixed reference signal level at which the positioning of vehicle can be determined by detecting the falling of signal level to the reference point.

Experimental results will be described in more detail. For instance in the case where, on a three-lane highway, a split beam antenna is installed as a roadside antenna alongside the first lane, and an antenna of which main radiation lobe extends upwardly is used as the mobile antenna on a vehicle, the signal received by the mobile antenna on the vehicle traveling in the first lane is the highest in level (A in FIG. 5 and FIG. 6A), the signal received by the mobile antenna of the vehicle traveling in the third lane is lowest, and that received by the mobile antenna of the vehicle in the second lane falls between those two signals in level (B in FIG. 5 and FIG. 6B).

It is observed that there exists about 10 dB variations in receiving signal level according to the lane the vehicle is moving; however the sharp falling of the signal level just in front of the roadside antenna can be seen on any lanes.

This difference was observed in the experiment with only one set of roadside devices and the same mobile devices respectively. Considering a practical case in which a lot of beacon antennas are employed and a huge number of vehicles are involved, the variations in the signal level may actually become larger than 10 dB. Therefore, it is substantially impossible to set an absolute reference level for detecting the abrupt decrease the received signal.

SUMMARY OF THE INVENTION

In view of the foregoing, an object of the present invention is to provide a roadside beacon system in which required functions can be readily added, and the calibration of the vehicle position, which is the primary function of the system, can be performed with high stability without being affected by multi-path fading and also variation of signal level caused by positional difference between lanes.

The foregoing object of this invention has been achieved by the provision of a roadside beacon system in which, according to the invention, the roadside antennas are split beam antenna having a directivity such that the electric field strength abruptly decreases exactly in front of the antenna, and a navigation device installed in a vehicle receiving signals from the roadside antenna and used to calibrate and display vehicle position data comprises: smoothing means for eliminating instantaneous level variation components from one of two signals which are provided by dividing the signal thus received to provide a smoothed signal; position detection region determining means for outputting, when the level of the smoothed signal provided by the smoothing means exceeds a predetermined value, a position detection region determination signal indicating that the vehicle is approaching near the roadside antenna; position determining gate means receiving the position detection region determination signal as a control input signal and supplying the other signal obtained by dividing the received signal to position determining means for detecting an abrupt decrease point in level of the received signal; and calibrating means for calibrating at least position data according to a position determination signal outputted by the position determining means and the received data.

In the roadside beacon system, the smoothing means may be composed of a peak detector circuit and a time constant circuit, or it may be implemented with a low-pass filter.

Furthermore, in the roadside beacon system, it is preferable that a determination reference level in the position detection region determining means be higher than that in the vehicle position determining means.

In the roadside beacon system thus constructed, various data including position data are transmitted in the form of a split beam signal to the vehicles through the roadside antennas installed at predetermined positions.

The navigation device installed in each of the vehicles receives, as calibration data, predetermined data included in the signal transmitted through the roadside antenna. The signal received is divided into two signals, and one of which is supplied to the smoothing means so that instantaneous level variation components are eliminated, thus providing the smoothed envelope of signal level distribution. The smoothed signal is supplied to the position detection region determining means, which, when the level of the smoothed signal exceeds the predetermined value, outputs the position detection region determination signal indicating that the vehicle has reached near the roadside antenna. The position detection region determination signal is applied, as a control input signal, to the position determining gate means to open the latter. The other signal obtained by dividing the received signal is supplied to the position determining means adapted to detect the abrupt decrease point of received signal level. The calibrating means calibrates the position data according to the position determination signal outputted by the position determining means and the received data.

Thus, in the roadside beacon system of the invention, the signal received for position detection is divided into two ways, one of which is smoothed to eliminate instantaneous level variations and to give envelope of signal level distribution. The smoothed signal is utilized for detecting approaching of the vehicle to a roadside antenna. In response to such detection, the position determining gate means is opened to supply the other signal (instant signal) to the position determining means. Thus, the vehicle position can be determined according to the abrupt decrease in level of the received signal which is not smoothed.

The same effect can be obtained in the case where the smoothing means is implemented with a peak detector circuit and a time constant circuit, or in the case where a low pass filter is used.

Furthermore, in the case where the determination reference level in the position detection region determining means is higher than that in the position determining means, the position determining region can be limited to a narrow area whose center is exactly in front of the roadside antenna. Accordingly, it can be accurately detected when the vehicle passes just in front of the roadside antenna.

The foregoing object of the invention has further been achieved by the provision of a roadside beacon system in which, according to the invention, each of the roadside antennas installed alongside roads is a split beam antenna having a directivity such that the electric field strength abruptly decreases directly in front of the antenna, and a navigation device carried on a vehicle receiving a signal from the roadside antenna to calibrate and display vehicle position data the system comprising position detection region determining means for outputting, when the level of one of two signals obtained by dividing a received signal exceeds a predetermined value, a position detection region determination signal indicating that the vehicle is approaching the roadside antenna; position determining gate means receiving the position detection region determination signal as a control input signal and supplying the other of the two signals obtained by dividing the received signal to position determining means for detecting an abrupt decrease point in level of the received signal; reference signal forming means for detecting a peak value of the received signal and supplying a signal proportional to the peak value thus detected to the position determining means; and calibrating means for calibrating at least position data according to a position determination signal outputted by the position determining means and the received data.

In the roadside beacon system, the position detection region determining means may comprise smoothing means for eliminating instantaneous level variations in the electric field strength of the one of the two signals obtained by dividing the received signal to form a smoothed signal which smoothly changes in level, so that, when the level of the smoothed signal exceeds a predetermined (threshold) level, position detection region determination signals indicating that the vehicle is near the roadside antenna is outputted.

Furthermore, in the roadside beacon system of the invention, the smoothing means may comprise a peak detector circuit and a time constant circuit, or may comprise a low-pass filter.

In this navigation device, there is received has calibration data predetermined data included in the signal transmitted through the roadside antenna, the received signal is divided into two signals, and one of the two signals is supplied to the position detection region determining means so that, when the level of the one of the two signals exceeds the predetermined reference value, the position detection region determination signal is outputted to indicate that the vehicle is approaching near the roadside antenna. The position detection region determination signal is applied as a control signal to cause the position determining gate means to open the later so that the other of the two signals obtained by dividing the received signal is applied through the gate means to the position determining means which detects the abrupt decrease in level of the received signal. Furthermore in the inventive navigation device, the reference signal forming means detects the peak value of the signal received and supplies the signal proportional to the peak value, as a reference signal, to the position determining means. The position determining means provides the position determination signal when the level of the received signal falls to a level lower than that of the reference signal. The calibrating means calibrates the position data according to the position determination signal and the data obtained through the mobile antenna.

That is, in the roadside beacon system of the invention, the received signal is divided into two signals, and one of the two signals is utilized for detecting that the vehicle approaches near the roadside antenna, and the detection result is utilized to open the position determining gate means so that the other signal is supplied without modification to the position determining means, whereas a reference signal proportional to the peak value of the signal received is also applied to the position determining means. Therefore, the level of the reference signal can be changed in proportion to the level of the peak value of the received signal, and the position determination can be achieved utilizing the abrupt decrease in level of the received signal without being affected, for instance, by position of the lanes the vehicle is traveling in.

As described above, the position detection region determining means may have smoothing means for eliminating instantaneous level variation components in the electric field strength of the one of the two signals obtained by dividing the received signal to provide the smoothed signal so that, when the smoothed signal is higher in level than the predetermined value, the position detection region determination signal is outputted to indicate that the vehicle is in the region near the roadside antenna. In this case, the one of the two signals obtained by dividing the received signal is supplied to the smoothing means to eliminate instantaneous level variations in electric field strength to provide the smoothed signal, and when the level of the smoothed signal exceeds the predetermined value, the position detection region determining signal is outputted to indicate that the vehicle is located near the roadside antenna.

BRIEF DESCRIPTION OF THE DRAWINGS

FIGS. 4A through 4E are graphical representations indicating electric field strength distributions;

FIG. 11 is a block diagram showing another example of the roadside beacon system according to the invention;

FIG. 12 is a perspective view showing an example of a roadside antenna;

FIGS. 13A and 13B are diagrams showing the directivity pattern of the roadside antenna.

DESCRIPTION OF THE PREFERRED EMBODIMENTS

Preferred embodiments of the invention will now be described with reference to the accompanying drawings.

Figure 7:
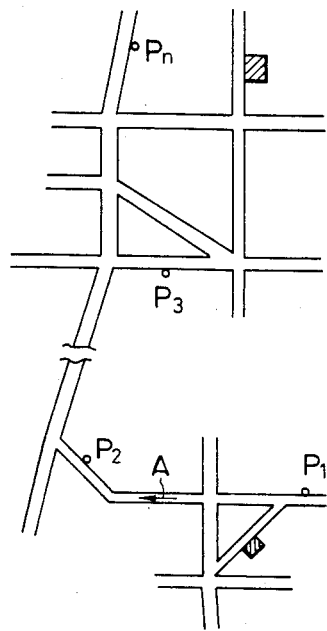
FIG. 7 is a diagram outlining an example of a road map displayed on a display unit.
Figure 8:
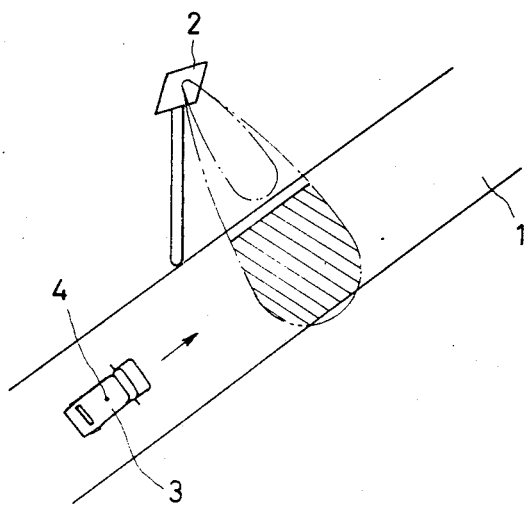

FIG. 7 is a diagram showing an example of a road map displayed on a display unit. In FIG. 7, the arrow A indicates the present position and the present direction of movement of a vehicle. Furthermore, roadside antennas $P_1$, $P_2$, ... and $P_n$ are indicated on the road map at positions corresponding to their actual positions (the display of these roadside antennas may be omitted, causing no difficulty in operation), and buildings or the like are indicated as hatched areas.

FIGS. 1, 2, 3 and 8 are diagrams outlining a roadside beacon system. A roadside antenna 2 for transmitting a signal representing position data and road direction data is installed along a road 1 at a predetermined position, whereas a mobile antenna 4 is installed on a vehicle traveling on the road 1 to receive the signal from the roadside antenna 2. The signal received by the mobile antenna is supplied to a navigation device (not shown).

The mobile antenna 4 is an antenna whose main radiation lobe extends upwardly.

Figure 9:
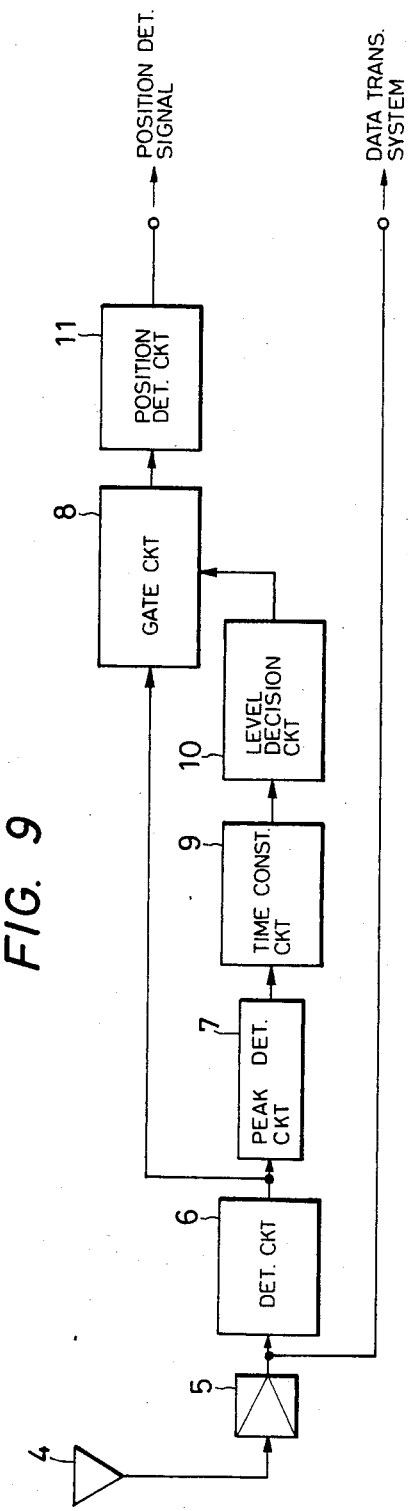
FIG. 9 is a block diagram showing a first example of a roadside beacon system according to the invention.

FIG. 9 is a block diagram showing an example of a roadside beacon system according to the invention, and more specifically a device installed on a vehicle to receive signals from roadside antennas.

The signal (proportional to the electric field strength distribution shown in FIGS. 4A to 4E) received by the mobile antenna 4 is amplified by an amplifier 5, and detected by a detector circuit 6. The output of the detector circuit 6 is supplied to a peak detector circuit 7 and to a gate circuit 8 for position detection. The peak detector circuit 7 outputs a peak signal, which is applied to a time constant circuit 9. The circuit 9 provides a stabilization signal, which is applied to a level decision circuit 10 for establishing a position detection region. The circuit 10 provides a decision signal, which is applied as a control signal to the gate circuit 8. The detection signal outputted through the gate circuit 8 is supplied directly to a position detection circuit 11, which outputs a position detection signal. The signal amplified by the amplifier 5 is supplied as a data signal to a data transmission system (not shown).

The peak detector circuit 7 receives the output signal of the detector circuit 6 and detects the maximum value of the instantaneous level variations and holds that value until it detects a larger maximum value at a later instant.

Figure 10:
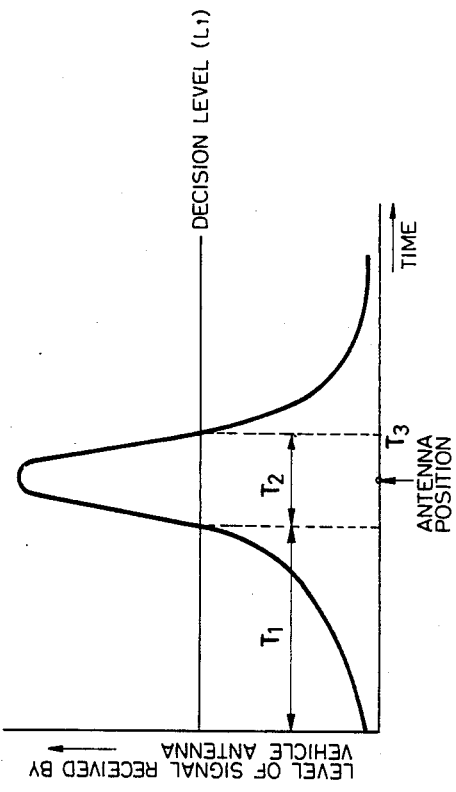
FIG. 10 is a diagram showing the waveform of a signal for determination of a position detection region.

The time constant circuit 9 includes a discharge circuit having a time constant which is larger than the period of the above-described instantaneous level variation. Therefore, when a signal corresponding to the instantaneous peak value of the signal proportional to the field strength distribution is applied to the time constant circuit 9, the latter will output a triangular-wave-shaped signal which increases gradually in level and then decreases gradually, as shown in FIG. 10.

The level decision circuit 10 receives the output signal of the time constant circuit 9 and compares it with a reference level signal ($L_1$ in FIG. 4E), and supplies a control signal to the gate circuit 8 for the period of time for which the output signal is larger than the reference level signal, thereby to open the gate circuit 8.

Figure 1:
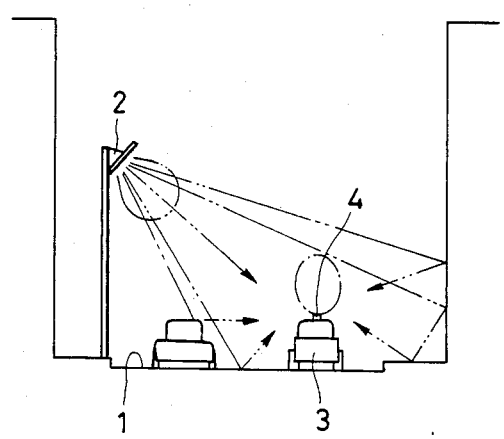
FIG. 1 is a diagram for a description of a multi-path fading phenomenon.
Figure 2:
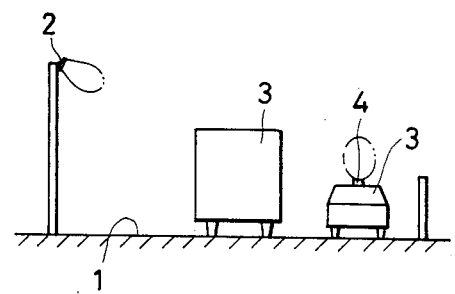
FIGS. 2, 3 and 8 are perspective views outlining a roadside beacon system.
Figure 3:
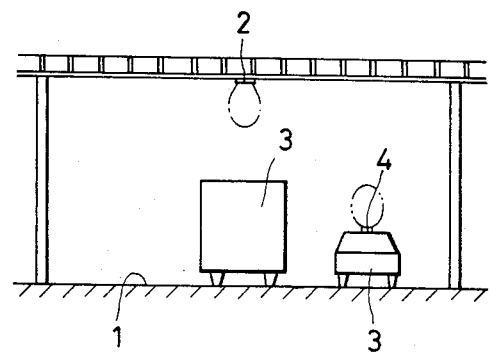
Figure 4E:
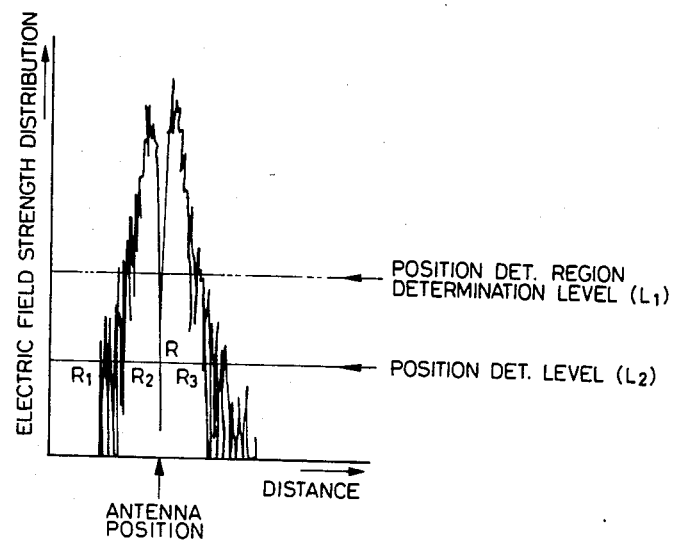
Figure 5:
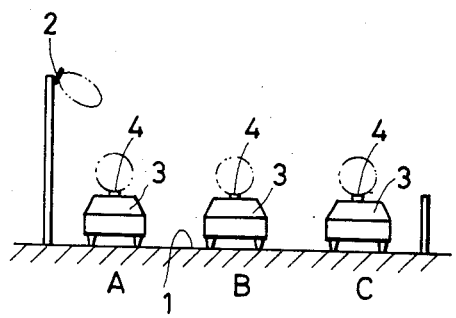
FIG. 5 is an explanatory diagram showing relations between the roadside antenna and traffic lanes.
Figure 6:
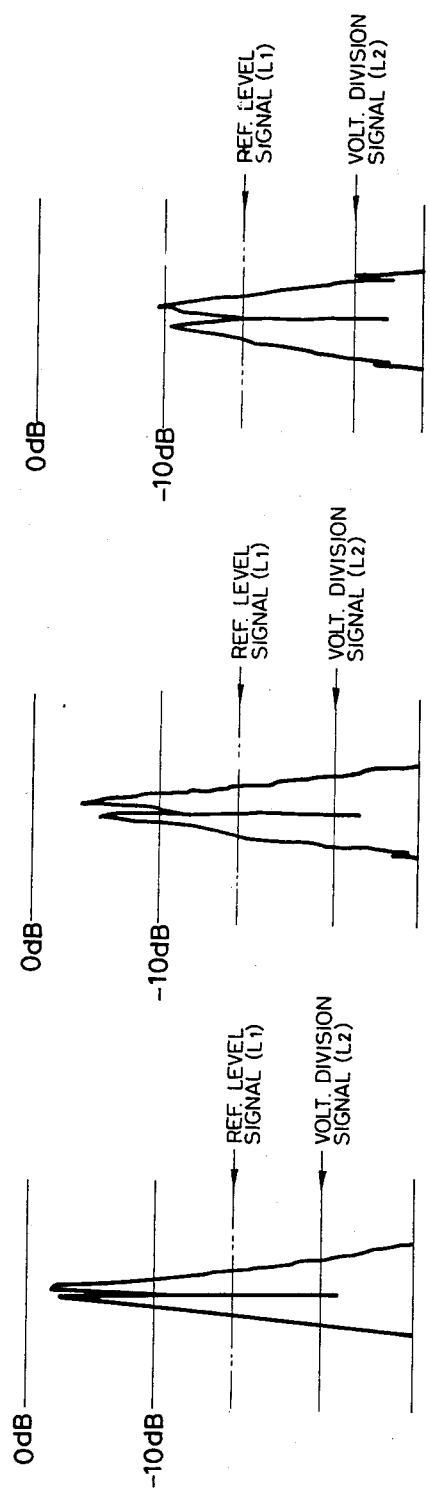
FIGS. 6A to 6C are graphical representations indicating the waveforms of signals received by different vehicles in different traffic lanes with a voltage division signal $L_2$.

The signal proportional to the field strength distribution is supplied through the gate circuit 8 directly to the position detection circuit 11, where the signal is compared with a predetermined reference level signal ($L_2$ in FIG. 4E). As a result, the position detection circuit 11 outputs the position detection signal at the time when the signal becomes smaller than the reference level signal.

The operation of the mobile device thus constructed is as follows:

The signal received by the mobile antenna 4, after being amplified by the amplifier 5, is supplied to the data transmission system (not shown). In the data transmission system, original data are obtained for instance, by demodulation and are stored in memory temporarily, and are then transmitted to other control sections when necessary.

On the other hand, the output signal of the amplifier 5 is applied to the detector circuit 6, the output of which is supplied to the gate circuit 8 for position detection and to the peak detector circuit 7. The output signal of the detector circuit 6 has an instantaneously variable level. However, the output signal is converted by the peak detector circuit 7 and the time constant circuit 9 into a smooth signal which is substantially free from instantaneous level variations. This smooth signal is supplied to the level decision circuit 10 in which it is compared with the reference level signal $L_1$ (FIG. 4E). When the signal is larger than the reference level signal $L_1$, the level decision circuit 10 applies a control signal to the gate circuit 8 to open the latter so that the detection signal is supplied to the position detection circuit 11. In the position detection circuit 11, the signal detected by the detector circuit 6 and including instantaneous level variations is compared with the reference level signal $L_2$ (FIG. 4E). When it is smaller than the reference level signal $L_2$, the position detection signal is outputted by the position detection circuit 11.

Upon generation of the position detection signal, the position data and the direction data stored in memory in the data transmission system (not shown) are supplied to a navigator (not shown) for calibration of the navigation system. Thereafter, the present position and the present direction of movement of the vehicle are calculated according to the navigation data thus calibrated, and are displayed together with the road map on the display unit.

The operation of the embodiment of FIG. 9 will be described in more detail. The case will be considered where the vehicle 3 traveling along the road 1 approaches the roadside antenna 2 and then leaves it. First, the signal received by the mobile antenna 4 is substantially zero in level, and therefore a signal which is lower in level than the reference level signal $L_1$ is applied to the level decision circuit 10, so that the latter outputs a low level signal. Accordingly, the gate circuit 8 is maintained closed; that is, no data is transmitted to the position detection circuit 11 ($T_1$ in FIG. 10).

As the vehicle approaches the roadside antenna, the level of the signal proportional to the average field distribution function increases gradually. When the signal supplied to the level decision circuit 10 becomes larger in level than the reference level signal $L_1$, the circuit 10 outputs a high level signal. As a result, the gate circuit 8 is opened so that the signal detected by the detector circuit 6 is supplied to the position detection circuit 11 ($T_2$ in FIG. 10). The position detection circuit 11 compares the signal detected by the detector circuit 6 with the reference level signal $L_2$, and it outputs the position detection signal when the output signal of the detector circuit becomes lower than the reference level signal $L_2$. The position detection signal is supplied to the navigator (not shown), so that the predetermined data stored in memory are applied to the navigator for calibration of the present position stored in the device body.

After the vehicle 3 passes the roadside antenna 2, the level of the signal supplied to the level decision circuit 10 gradually decreases according to the time constant of the time constant circuit 9. When it falls below the reference level signal $L_1$, the level decision circuit 10 outputs the low level control signal. The low level control signal is supplied to the gate circuit 8 to close the latter, and simultaneously the position detection circuit 11 is reset. Thus, the device becomes ready for the next calibration ($T_3$ in FIG. 10).

FIG. 11 is a block diagram showing a second example of a roadside beacon system according to the invention. The roadside beacon system of FIG. 11 differs from that of FIG. 9 only in that a bandpass filter 12 is connected between the amplifier 5 and the detector circuit 6.

The roadside beacon system of FIG. 11 will be described in more detail. This embodiment is especially effective in the case where the roadside antenna 2 transmits a data radio wave and a position detecting radio wave which are produced using different modulation systems. The signal amplified by the amplifier 5 is supplied to the bandpass filter 12 so that only the signal for position detection is extracted and supplied to the detector circuit 6. Thereafter, the signal is processed in the same manner as that in the first embodiment of FIG. 9.

As is apparent from the above description, in the roadside beacon system of the invention, the smooth signal obtained by eliminating instantaneous level variation components from the detection signal is employed as a signal for detecting the position detection region. Therefore, the roadside beacon system of the invention can accurately detect the region where the position detecting operation should be carried out, without being affected by multi-path fading or by the presence of large vehicles traveling beside the vehicle and shielding or scattering the radio waves radiated by the roadside antenna, and in the region thus detected, the abrupt decrease point produced by the dual-beam antenna can be detected according to the detection signal itself.

That is, the position detecting operation is carried out using the detection signal which has not been smoothed. The abrupt decrease point of the dual-beam is thus maintained, and therefore the position detection can be achieved with high accuracy.

FIG. 12 shows an example of a roadside antenna. The roadside antenna includes two reflecting panels 21 which form an angle of $2\Phi_0$ and are inclined by an angle of $\theta_0$ downward, and dipole antennas 22 installed on the reflecting panels 21 at predetermined positions. The dipole antennas 22 are excited by signals which differ by 180° in phase.

Installation conditions of the dipole antennas 22, and the horizontal and vertical directivities thereof are as follows: $2\Phi_0 = 90°$. The distance d between each of the dipole antennas 22 and the respective reflecting panel 21 is 50 mm (d 50 mm). The distance D between the connecting line of the two reflecting panels 21 and each of the dipole antennas 22 is 100 mm (D=100 mm). The length L of each of the dipole antennas 22 is 10 mm (L=120 mm). If the signal frequency f is 1.5 GHz (f=1.5 GHz), the horizontal directivity is such that, as shown in FIG. 13A, the field strength drops rapidly at the center; that is, the field strength distribution includes an abrupt decrease point (or zero point). On the other hand, the vertical directivity is considerably high, as shown in the FIG. 13B.

Thus, in the roadside beacon system employing the roadside antenna thus constructed and the mobile device described above, the vehicle position can be detected accurately without being affected by multi-path fading or by the presence of a large vehicle beside the vehicle and which shields or scatters the signal.

This invention is not limited to the above-described embodiments. For instance, instead of the peak detector circuit 7, a low pass filter may be used. In the case where the roadside antenna radiates both a position detecting radio wave and a data transmitting radio wave, the position detecting radio wave may be an amplitude-modulated signal, and the data transmitting radio wave may be a phase-modulated signal. Furthermore, it is obvious to those skilled in the art that various changes and modifications may be made in the above embodiments without departing from the invention.

As described above, in the invention, the signal received for position detection is, on one hand, processed to remove instantaneous level variation components to provide a smooth signal which is used for detecting the region where the position detecting operation should be carried out, and on the other utilized directly to detect the abrupt level decrease attributed to the dual-beam. Therefore, with the roadside beacon system of the invention, position detecting operations can be accurately carried out without being affected by multi-path fading or by the presence of a large vehicle beside the vehicle which shields or scatters the signal from the roadside antenna. Hence, the quantity of transmission data can be increased.

Thus, in the roadside beacon system employing the roadside antenna thus constructed and the mobile device described above, the vehicle position can be detected accurately without being affected by multi-path fading or by the presence of a large vehicle beside the vehicle and which shields or scatters the signal.

Figure 14:
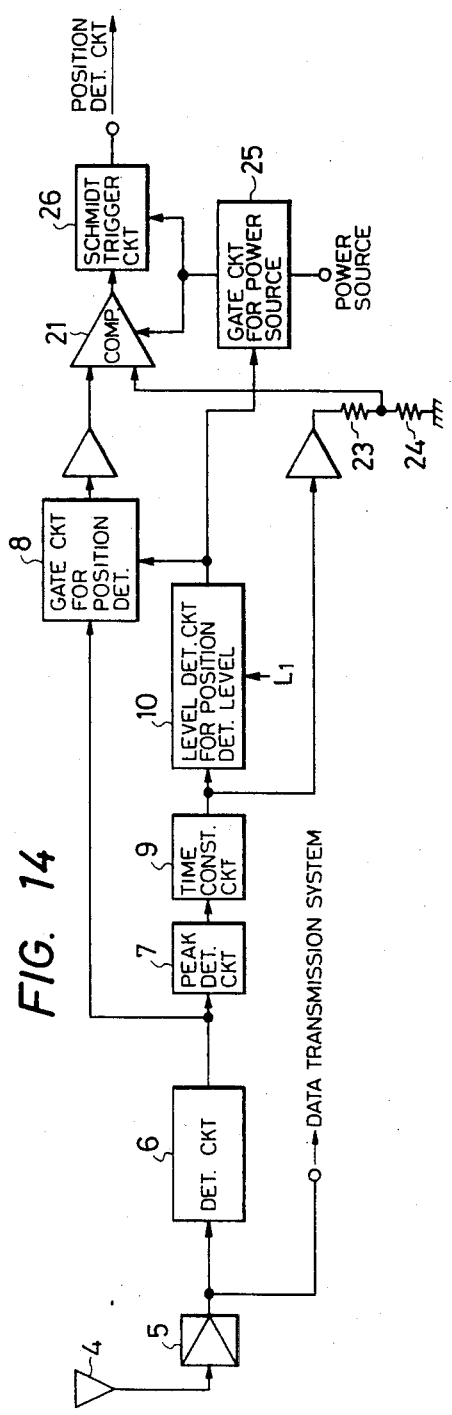
FIGS. 14 and 15 are block diagrams of further embodiments of roadside beacon systems of the invention.

FIG. 14 is a block diagram showing another example of a roadside beacon system according to this invention.

The signal received by the mobile antenna 4 is amplified by an amplifier 5 and detected by a detector circuit 6 and then applied to a peak detector circuit 7 and a position detection gate circuit 8. The peak detector circuit 7 outputs a peak signal, which is applied to a time constant circuit 9. The time constant circuit 9 provides a stabilization signal, which is applied to a position detection region level decision circuit 10 and to a voltage divider circuit composed of resistors 23 and 24. The level decision circuit 10 outputs a decision signal, which is applied as a control signal to the gate circuit 8 and to a power source gate circuit 25. The detection signal outputted through the gate circuit 8 and a reference signal outputted by the voltage division circuit are applied to a position detecting circuit, namely, a comparator 21. The latter outputs a decision signal according to the detection signal and the reference signal. The decision signal is applied to a Schmitt trigger circuit 26, which outputs a position detection signal, which is a pulse signal.

On the other hand, the signal amplified by the amplifier 5 is applied to a data transmission system directly.

A supply voltage is supplied through the gate circuit 25 to the comparator 21 and the Schmitt trigger circuit 26.

The device shown in FIG. 14 will be described in more detail. The peak detector circuit 7 receives the output signal from the detector circuit 6 and detects therein a maximum value in instantaneous level variations and holds that level until a larger maximum value is detected.

The time constant circuit 9 is composed of an electric discharge circuit having a time constant larger than the above-described instantaneous level variations period. Therefore, since a signal corresponding to the instantaneous peak value of the signal proportional to the electric field strength distribution is applied to the circuit 9, the latter outputs a signal upwardly curved in waveform which, as shown in FIG. 10, increases gently in level and then decreases also gently.

In the position detect in region level decision circuit 10, the output signal of the time constant circuit 9 is compared with a predetermined reference level signal ($L_1$ in FIG. 4E). In correspondence to the period of time that the output signal is larger than the reference level signal, the level decision circuit 10 supplies the control signal to the position detection gate circuit 8 and to the power source gate circuit 25 to open the gate circuit 8.

The above-described voltage divider circuit is used to subject the output signal of the time constant circuit 9, i.e., the peak value of the received signal, to voltage division with a predetermined voltage division ratio. The voltage division signal is applied, as a reference signal, to the comparator 21.

The signal proportional to the electric field strength distribution is applied, as a comparison signal to a comparator 21 through the gate circuit 8, while the voltage division signal is applied, as a reference signal, to the comparator 21, in which the former signal is compared with the later signal. When the comparison signal is higher than the reference signal, the comparator 21 outputs a low level signal, and when the comparison signal is lower than the reference signal, the comparator 21 outputs a high level signal.

The Schmitt trigger circuit 26 produces a pulse signal according to the variation in level of the output signal of the comparator 21. The pulse signal thus formed is outputted as a position detection signal.

The operation of the mobile device thus constructed is as follows:

The signal received through the mobile antenna 4, after being amplified to a predetermined level by the amplifier 5, is applied to the data transmission system (not shown). In the data transmission system, the original data are obtained, for instance, by demodulation, stored in memory temporarily, and then transmitted to other control sections as necessary.

On the other hand, the output signal of the amplifier 5 is applied to the detector circuit 6, the output of which is supplied to the gate circuit 8 and to the peak detector circuit 7. The output signal of the detector circuit 6 is instantaneously variable in level. However, the output signal is converted by the peak detector circuit 7 and the time constant circuit 8 into a smooth signal which is substantially free from instantaneous level variations. This smooth signal is supplied to the level decision circuit 10 and to the voltage divider circuit. In the level decision circuit 10, the smooth signal is compared with the reference level signal $L_1$ (FIG. 10). When the smooth signal is larger than the reference level signal, the level decision circuit 10 supplies the control signal to the gate circuit 8 to open the latter. As a result, the detection signal, together with the voltage division signal $L_2$ (FIG. 4E) provided by the voltage divider circuit, is applied to the comparator 21. At the same time, the power source gate circuit 25 is opened so that a supply voltage is applied to the comparator 21 and the Schmitt trigger circuit 26. In the comparator 21, the signal detected by the detector circuit 6 and including instantaneous level variations is compared with the voltage division signal $L_2$. When the signal is lower than the voltage division signal $L_2$, the high level signal is outputted. The high level signal is applied to the Schmitt trigger circuit 26. Therefore, in response to the high level signal, the pulse signal, i.e., the position detection signal, is outputted by the Schmitt trigger circuit 26.

Upon provision of the position detection signal, the position data and the direction data stored in memory in the data transmission system (not shown) are supplied to a navigator (not shown) for calibration of navigation data. Thereafter, the present position and the present direction of movement of the vehicle are calculated according to the navigation data thus calibrated so that they are displayed together with the road map on the display unit.

The operation of the mobile device of FIG. 14 will be described in more detail. The case will be considered where the vehicle 3 traveling along the road 1 approaches the roadside antenna 2 and then leaves it. First, the signal received through the mobile antenna 4 is substantially zero in level, and therefore a signal which is lower in level then the reference level $L_1$ is applied to the level decision circuit 10 so that the latter outputs a low level signal. Accordingly, the gate circuits 8 and 25 are maintained closed and the comparator 21 is held inoperative ($R_1$ in FIG. 10).

As the vehicle approaches the roadside antenna 2, the level of the signal proportional to the average field distribution function increases gradually. When the signal supplied to the level decision circuit 10 becomes larger in level than the reference signal $L_1$, the level decision circuit 10 outputs a high level signal. As a result, the gate circuit 8 is opened so that the signal detected by the detector circuit 6 is supplied to the comparator 21, while the gate circuit 25 is opened so that the supply voltage is applied to the Schmitt trigger circuit 26 (cf. $T_2$ in FIG. 10). The comparator 21 compares the signal detected by the detector circuit 6 with the voltage division signal $L_2$ formed by the voltage divider circuit. When the former signal is lower than the latter, the comparator 21 outputs a high level signal. The high level signal thus outputted is applied to the Schmitt trigger circuit 26, which then generates the pulse signal, namely, the position detection signal. The position detection signal is supplied to the navigator (not shown), so that the predetermined data stored in memory are applied to the navigator for calibration of the present position stored in the device body.

After the vehicle 3 passes the roadside antenna 2, the level of the signal supplied to the level decision circuit 10 gradually decreases according to the time constant of the time constant circuit 9. When it becomes lower than the reference level $L_1$, the level decision circuit 10 outputs a low level control signal. The low level control signal is supplied to the position detection gate circuit 8 and the power source gate circuit 25. As a result, the gate circuit 8 is closed, and at the same time the comparator 21 and the Schmitt trigger 26 are reset. Thus, the device becomes ready for the next calibration ($T_3$ in FIG. 10).

When the vehicle passes the roadside antenna, the level of the signal received through the mobile antenna 4 depends on what lane the vehicle is in. However, since the voltage division signal $L_2$ changes in proportion to the peak value of the received signal, the detection of the abrupt decrease in level of the received signal can be positively achieved without being affected by the variation in level of the received signal.

Figure 15:
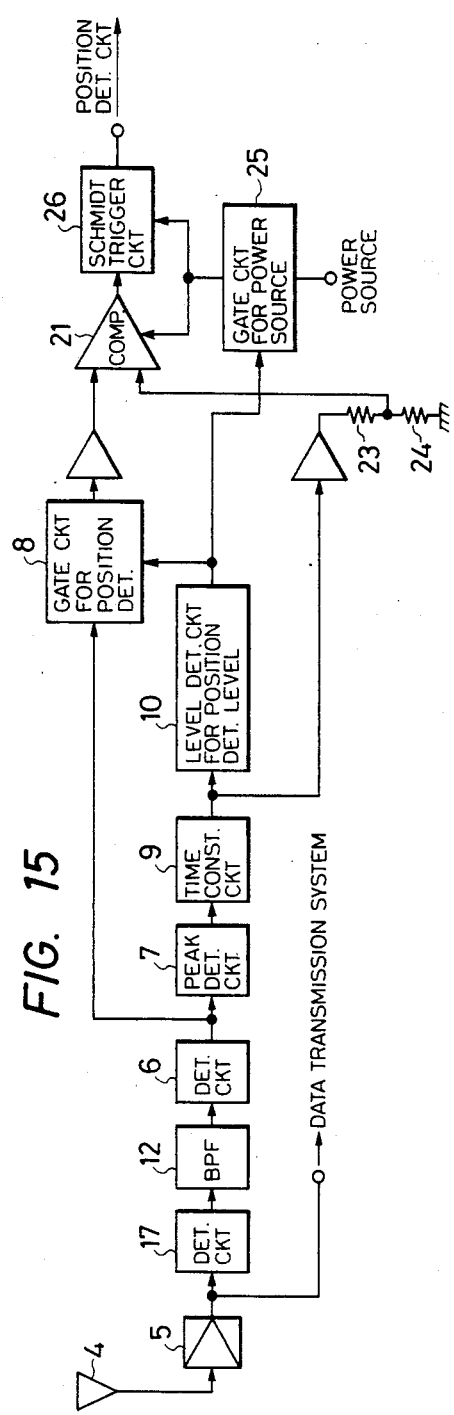

FIG. 15 is a block diagram showing still another embodiment of the invention. The embodiment of FIG. 15 differs from that of FIG. 14 only in that a bandpass filter 22 and a detector circuit 27 are connected between the amplifier 5 and the detector circuit 6.

The embodiment of FIG. 15 will be described in more detail. The embodiment is effective in the case where the roadside antenna 2 radiates a data transmitting radio wave and a position detecting radio wave which are produced using different modulation systems. The signal amplified by the amplifier 5 is detected by the detector circuit 22. The output of the detector circuit 27 is applied to the bandpass filter 22 so that only the signal for position detection is extracted and supplied to the detector circuit 6. Thereafter, the signal is processed in the same manner as that in the embodiment of FIG. 14.

As is apparent from the above description, in the roadside beacon system of the invention, the smooth signal obtained by eliminating instantaneous level variation components from the detection signal is employed as a signal for detecting the position detection region. Therefore, the roadside beacon system of the invention can accurately detect the region where the position detecting operation should be carried out, without being affected by multi-path fading or by the presence of a large vehicle beside the vehicle which shields or scatters the radio waves radiated by the roadside antenna, and in the region thus selected, it can detect the abrupt decrease point of the split beam according to the detection signal and according to the signal proportional to the peak value of the received signal.

That is, the position detecting operation is carried out in response to the detection signal which has not been smoothed. Therefore, the abrupt decrease point of the split beam is maintained. In addition, when the level of the received split beam changes, the reference signal level also changes with the split beam's level. Thus, position detection can be achieved with high accuracy.

As described above, in accordance with the invention, the signal received for position detection is divided into two signals, and one of the two signals is utilized in such a manner that the region where the position detecting operation is carried out according to the received signal level, while the other is utilized in such a manner that the signal proportional to the peak of the received signal is employed as the reference signal for the level comparison operation. Therefore, with the roadside beacon system of the invention, the position detecting operation can be accurately carried out without being affected by multi-path fading or by the presence of a large vehicle beside the vehicle which shields and also scatters the radio waves or by the distance between the vehicle and the roadside antenna. Thus, the quantity of transmission data can be increased.

What is claimed is:

1. In a roadside beacon system in which various data are transmitted between roadside antennas installed along roads at predetermined positions and vehicles, and each of said roadside antennas is a split beam antenna having a directivity such that an electric field strength of the signal radiated therefrom abruptly decreases in front of said antenna, a navigational device carried on a vehicle receiving a signal from said roadside antenna to calibrate and display vehicle position data, said navigational device comprising:

signal dividing means for dividing a signal received from said antenna into two division signals;
smoothing means for eliminating instantaneous level variations in a first of said division signals to provide a smoothed signal;
position detection region determining means for outputting, when a level of said smoothed signal provided by said smoothing means exceeds a first predetermined reference level, a position detection region determination signal indicating that said vehicle is existing near said roadside antenna;
position determining means for detecting when an electric field strength level of said received signal decreases abruptly to fall below a second predetermined reference level;
position determining gate means for receiving said position detection region determination signal as a control input signal, and for supplying the second division signal directly to said position determining means in response to said control input signal; and
calibrating means for calibration said navigational device according to a position determination signal outputted by said position determining means and received data.

2. The roadside beacon system as claimed in claim 1, in which said smoothing means comprises a peak detector circuit and a time constant circuit.

3. The roadside beacon system as claimed in claim 1, in which said smoothing means comprises a low-pass filter.

4. The roadside beacon system as claimed in claim 1, in which said predetermined reference level used in said position detection region determining means is higher than said second predetermined reference level used in said position determining means.

5. In a roadside beacon system in which various data are transmitted between vehicles and roadside antennas installed along roads at predetermined positions, and each of said roadside antennas is a split beam antenna having a directivity such that an electric field strength abruptly deceases in front of said antenna, a navigational device carried on a vehicle receiving a signal from said roadside antenna to calibrate and display vehicle position data, said navigational device comprising:

signal division means for dividing a signal received from said antenna into two division signals;
position detection region determining means for outputting, when a level of a first of said two division signals exceeds a first predetermined reference level, a position detection region determination signal indicating that said vehicle is located near said roadside antenna;
position determining means for detecting when an electric field strength level of said received signal decreases abruptly to fall below a second predetermined reference level;
position determining gate means for receiving said position detection region determination signal as a control input signal, and for supplying the second of said two division signals directly to said position determining means in response to said control input signal;
reference signal forming means for detecting a peak value of said received signal, and for supplying a signal proportional to said peak value thus detected as a second predetermined reference signal to said position determining means; and
calibrating means for calibrating said navigator device according to a position determination signal outputted by said position determining means and received data.

6. The roadside beacon system as claimed in claim 5, in which said position detection region determining means comprises smoothing means for eliminating instantaneous electric field strength level variations from the first of said two division signals to form a smoothed signal which gently changes in level, and outputs when the level of said smoothed signal exceeds said first predetermined level, a position detection region determination signal indicating that said vehicle is located near said roadside antenna.

7. The roadside beacon system as claimed in claim 6, in which said smoothing means comprises a peak detector circuit and a time constant circuit.

8. The roadside beacon system as claimed in claim 6, in which said smoothing means comprises a low-pass filter.

9. The roadside beacon system as claimed in claim 1, wherein said position determining means comprises:

voltage divider means for receiving and applying a voltage division operation to said smoothed signals from said smoothing means to obtain and output, as a function of a peak voltage level of said smoothed signal, a voltage level signal representing said second predetermined reference level.

10. The roadside beacon system as claimed in claim 9, wherein said position determining means further comprises:

comparator means for receiving and comparing said second division signal and said second predetermined reference level, and for outputting said position determination signal when a comparison indicates that an electric field strength of said second division signal decreases abruptly to fall below said second predetermined reference level.

11. The roadside beacon system as claimed in claim 5, wherein said reference signal forming means comprises:

voltage divider means for receiving and applying a voltage division operation to said peak valve of said received signal to obtain and output, as a function of said peak value, a voltage level signal representing said second predetermined reference level.

12. The roadside beacon system as claimed in claim 11, wherein said position determining gate means comprises:

comparator means for receiving and comparing a second of said two division signals and said second predetermined reference level, and for outputting said position determination signal when a comparison indicates that an electric field strength of said second of said two division signals decreases abruptly to fall below said second predetermined reference level.

* * * * *